(12) United States Patent
Kjellqvist et al.

(10) Patent No.: US 7,709,990 B2
(45) Date of Patent: May 4, 2010

(54) POWER WRENCH

(75) Inventors: Peter Kjellqvist, Mölnbo (SE); Tobias Lindbäck, Huddinge (SE)

(73) Assignee: Atlas Copco Tools AB, Stockholm (SE)

( * ) Notice: Subject to any disclaimer, the term of this patent is extended or adjusted under 35 U.S.C. 154(b) by 514 days.

(21) Appl. No.: 11/571,556

(22) PCT Filed: Jun. 22, 2005

(86) PCT No.: PCT/SE2005/000988

§ 371 (c)(1),
(2), (4) Date: Sep. 19, 2007

(87) PCT Pub. No.: WO2006/004495

PCT Pub. Date: Jan. 12, 2006

(65) Prior Publication Data

US 2008/0136270 A1    Jun. 12, 2008

(30) Foreign Application Priority Data

Jul. 1, 2004    (SE) .................................. 0401753

(51) Int. Cl.
*H02K 1/00*    (2006.01)
(52) U.S. Cl. .................... 310/179; 310/50; 310/184
(58) Field of Classification Search ............... 310/50, 310/179, 184, 198, 71, 43
See application file for complete search history.

(56) References Cited

U.S. PATENT DOCUMENTS

| | | | | | |
|---|---|---|---|---|---|
| 4,937,513 | A | * | 6/1990 | Hoemann et al. | 318/772 |
| 5,041,775 | A | * | 8/1991 | Erdman | 318/812 |
| 5,155,421 | A | * | 10/1992 | Hansson | 318/434 |
| 5,218,283 | A | * | 6/1993 | Wills et al. | 318/748 |
| 7,453,225 | B2 | * | 11/2008 | Friberg | 318/450 |
| 2001/0028202 | A1 | | 10/2001 | Chen | 310/189 |
| 2003/0080703 | A1 | * | 5/2003 | Elliott et al. | 318/432 |
| 2003/0128008 | A1 | | 7/2003 | Marioni | 318/721 |
| 2005/0016333 | A1 | * | 1/2005 | Compton | 81/177.85 |
| 2007/0103102 | A1 | * | 5/2007 | Friberg | 318/254 |
| 2008/0191563 | A1 | * | 8/2008 | Meldert | 310/50 |

FOREIGN PATENT DOCUMENTS

| EP | 0 574 823 A2 | 12/1993 |
|---|---|---|
| EP | 1 351 375 A1 | 10/2003 |

\* cited by examiner

*Primary Examiner*—Thanh Lam
(74) *Attorney, Agent, or Firm*—Greenberg Traurig LLP

(57) ABSTRACT

The present invention relates to a power-wrench comprising an electrical converter-fed motor having a permanent-magnetized rotor and a stator provided with winding, the motor winding (1) comprising at least two winding parts, which independently of each other are connected and disconnected by a switch-over device (4). According to the invention, a first winding part (2) may be arranged to control the magnetic field of the motor so that the motor, having the first winding part (2) connected, is adapted for the threading-down phase of the nut driving and operates with low torque and high number of revolutions adapted to said phase, as well as that a second winding part (3) may be arranged to control the magnetic field of the motor so that the motor, having the second winding part (3) connected, is adapted for the final-threading phase of the nut driving and operates with high torque and low number of revolutions adapted to said phase.

10 Claims, 1 Drawing Sheet

POWER WRENCH

TECHNICAL FIELD OF THE INVENTION

The present invention relates to a power-wrench. The power-wrench comprises an electrical converter-fed motor having a permanent-magnetized rotor and a stator provided with winding.

FIELD OF THE INVENTION

Nut-driving systems for industrial applications, such as vehicle industry, make high demands on performance and accuracy. In nut driving, in the normal case, a substantially lower torque is required during threading down than during final driving. In order to provide a power-wrench that guarantees a quick as well as controlled tightening process, it is desirable that the motor of the power-wrench during the first part of the tightening process, the threading-down part, operates with a high number of revolutions for a quick process and simultaneously with a relatively low torque since this part of the process does not require any higher torque, while during the second part of the tightening process, the final-driving part, instead it operates with a low number of revolutions for accurate precision and a high torque for the requisite tightening.

In modern driving systems for power-wrenches, permanent-magnetic motors are most often used. In a permanent-magnetized motor, the magnetization of the rotor is set by permanent magnets, which entails that the magnetization of the rotor cannot be controlled during operation, whereby the peak torque and number of revolutions are highly connected to the linked magnetic flux of the motor. Thus, this type of motors gives limited possibility of controlling the flow of the motor and thereby also limited possibility of controlling the maximum torque and number of revolutions of the motor. This makes that feeding converters have to be dimensioned to resist maximum torque and maximum number of revolutions simultaneously, which in turn requires high rated output. Also the control of torque and number of revolutions by means of field weakening via converters is problematic in a permanent-magnetized motor because of the low inductance thereof. The low inductance leads to a great demand for current in order to obtain a counter-magnetizing field, which in turn causes unacceptable losses.

The object of the present invention is to provide a power-wrench by means of which the torque as well as the number of revolutions can be controlled in an optimal way for the tightening process.

SUMMARY OF THE INVENTION

The present invention intends to provide a power-wrench that solves the above-mentioned problems. The power-wrench according to the present invention comprises an electrical motor having a permanent-magnetized rotor and a stator provided with winding, the winding comprising at least two winding parts. The winding parts are connected and disconnected independently of each other by a switch-over device.

The winding parts are engaged and disengaged independently of each other by means of the switch-over device.

By forming the winding in several parts, which can be connected and disconnected independently of each other, the number of turns of the motor and thereby the linked magnetic flux thereof can be controlled in such a way that the motor operates optimally regarding the torque and the number of revolutions during a full nut-tightening process in spite of the magnetic field of the rotor cannot be controlled.

During the first part of the process, the threading-down part, the winding parts are connected in such a way that the motor operates with a high number of revolutions but a low torque. This part of the process does not require a high torque but rather speed since the total processing time is desired to be as short as possible. In this case, feeding converters need to deliver lower voltage than in previous solutions since here the back electromotive force of the motor is low. This gives a correspondingly increased current during the threading down, but this current is still so low that it, in respect of losses, becomes negligible in comparison with the core losses of the motor.

Before the second part of the process, the tightening part, the winding is switched over so that the motor instead operates with a high torque for the tightening and a low number of revolutions for the precision.

In a preferred embodiment, the winding comprises two winding parts. A first winding part is arranged to control the magnetic field of the motor in such a way that the motor, having the first winding part connected, operates with low torque and high number of revolutions. This winding is intended to be used during the threading-down part. A second winding part is arranged to control the magnetic field of the motor in such a way that the motor, having the second winding part connected, operates with high torque and low number of revolutions, suitable for the second part of the process, the tightening part.

In an additional preferred embodiment, the first winding part is wound with wire having a substantially smaller cross-section area than the wire with which the second winding part is wound. The first winding part made with thin wire gives a possibility of making a very small winding, which may be placed in an existing motor design. This is particularly interesting for air gap-winding motors since an additional and also possibly simpler made threading-down winding can be placed in the air gap. The second part of the winding is made with thicker wire, which allows a high current in the stator and thereby a high torque on the motor when this winding is connected. This embodiment, having the windings made with different wire dimensions, is particularly suitable for applications where there is a very large difference between the threading-down torque and the tightening torque as well as for air gap-winding machines where the design of the winding is more flexible.

The windings are made optimized for the operating point of the motor regarding the torque and the number of revolutions for the respective process part and are connected for the respective operation case.

In an additional preferred embodiment, the first winding part and the second winding part are wound with different numbers of turns. Then, the torque and the number of revolutions are controlled by the number of turns. The first winding part, intended to be connected during the threading-down part, is made with a few turns whereby the machine operates with a low torque, while the second winding part is made with many turns whereby the motor operates with a high torque.

In a preferred embodiment, the switch-over device is arranged to connect said winding parts in series with each other. By the fact that the winding parts are connected in series, many ampere-turns are obtained, and thereby the higher torque that is required in the tightening part. The series connection has the advantage that the occurring winding area is utilized maximally.

In another preferred embodiment, the switch-over device is arranged to connect said winding parts so that they are used one at a time. Then, one winding part is connected for the threading down and one winding part is connected for the tightening.

In a preferred embodiment, the switch-over device comprises electromechanic breakers.

In another preferred embodiment, the switch-over device comprises semi-conductor components.

In an additional preferred embodiment, the switch-over device is arranged between said winding parts and the interconnection point of the phases of the motor. This has the advantage that simpler driving appliances may be used since all driving appliances can lie on the same floating potential.

In an additional preferred embodiment, the winding comprises more than two winding parts. Then, winding parts can be connected and disconnected in order to obtain an optimal nut-driving process depending on the application in which the power-wrench operates. One example is when the power-wrench operates in an application where the threading down consists of a pure threading down without any load, next followed by a threading down with a relatively high torque and finally a tightening with a very high torque. By means of this embodiment, the power-wrench can be adapted to a plurality of applications.

DETAILED DESCRIPTION OF PREFERRED EMBODIMENTS

The present invention will now be described in detail by means of accompanying figures.

Figure 1:
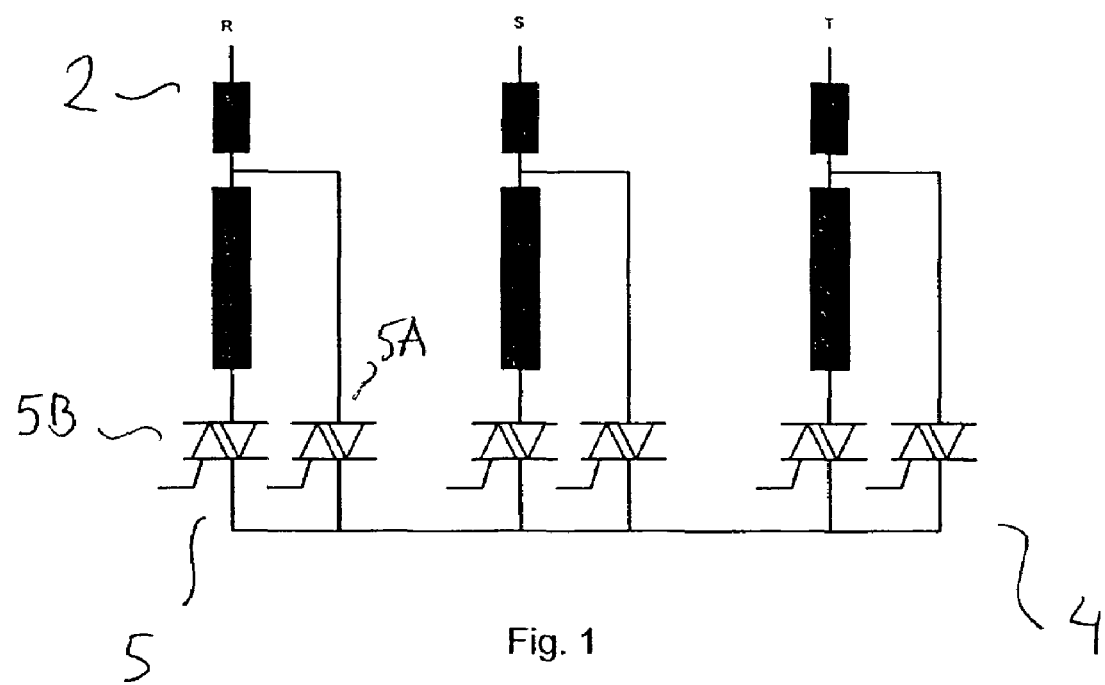
FIG. 1 shows a switching device having semiconductor components by means of which device two winding parts can be connected in series with each other.

FIG. 1 shows a switching device 4 having semiconductor components 5A, 5B by means of which either a first winding part 2 can be connected via the semi-conductor components 5A or two winding parts 2, 3 can be connected in series with each other via the semiconductor components 5B.

Figure 2:
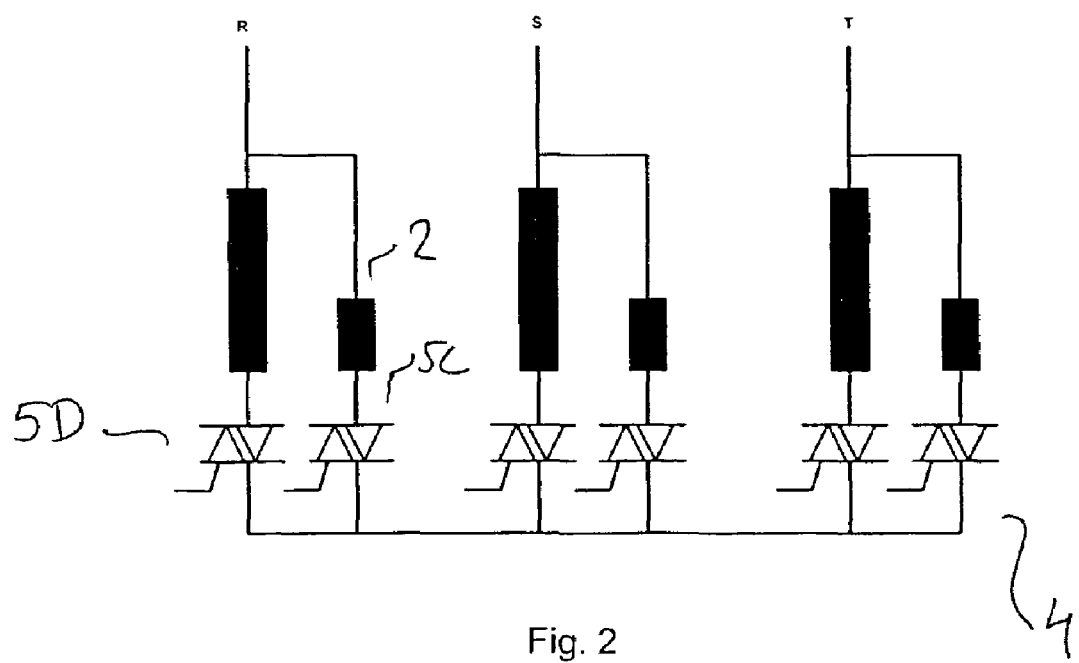
FIG. 2 shows a switching device having semiconductor components by means of which device two winding parts can be connected separately.

FIG. 2 shows a switching device having semiconductor components 5C, 5D by means of which device two winding parts 2, 3 can be connected either separately via the semiconductor components 5C or the semiconductor components 5D, or also be connected in parallel with each other via the semiconductor components 5C and the semiconductor components 5D.

The invention is not limited to the above embodiments given as examples, but may be made as modifications within the scope of the general idea according to the invention described in the appended claims.

The invention claimed is:

1. Power-wrench comprising an electrical converter-fed motor having a permanent-magnetized rotor and a stator provided with winding, the motor winding comprising at least two winding parts, which independently of each other are connected and disconnected by a switch-over device, characterized in that a first winding part is arranged to control the magnetic field of the motor so that the motor, having the first winding part connected, is adapted for the threading-down phase of the nut driving and operates with low torque and high number of revolutions adapted to said phase, as well as that a second winding part is arranged to control the magnetic field of the motor so that the motor, having the second winding part connected, is adapted for the final-threading phase of the nut driving and operates with high torque and low number of revolutions adapted to said phase.

2. Power-wrench according to claim 1, characterized in that said switch-over device is arranged between said winding parts and the interconnection point of the phases of the motor.

3. Power-wrench according to claim 2, characterized in that said first winding part is wound with wire having a substantially smaller cross-section area than the wire with which said second winding part is wound, the stator, when the first winding part is connected, obtaining a substantially lower back electromotive force, whereby the motor operates with a substantially higher number of revolutions, than when the second winding part is connected.

4. Power-wrench according to claim 1, characterized in that said winding parts are wound with wire having the same cross-section area.

5. Power-wrench according to claim 1, characterized in that said switch-over device is arranged to connect said winding parts in series with each other.

6. Power-wrench according to claim 5, characterized in that said switch-over device is arranged to connect said winding parts separately independently of each other.

7. Power-wrench according to claim 1, characterized in that said winding parts are wound with a different number of turns, whereby a different number of ampere-turns in the stator, and thereby differently large magnetic flux in the motor, is obtained depending on how the winding parts are connected.

8. Power-wrench according to claim 1, characterized in that said switch-over device comprises electromechanical breakers.

9. Power-wrench according to 1, characterized in that said switch-over device comprises semiconductor components.

10. Power-wrench according to claim 1, characterized in that said winding comprises more than two winding parts.

* * * * *